July 25, 1933.  J. W. SIMMONS  1,920,113
SPEED INDICATING DEVICE
Filed Aug. 16, 1929   2 Sheets-Sheet 1
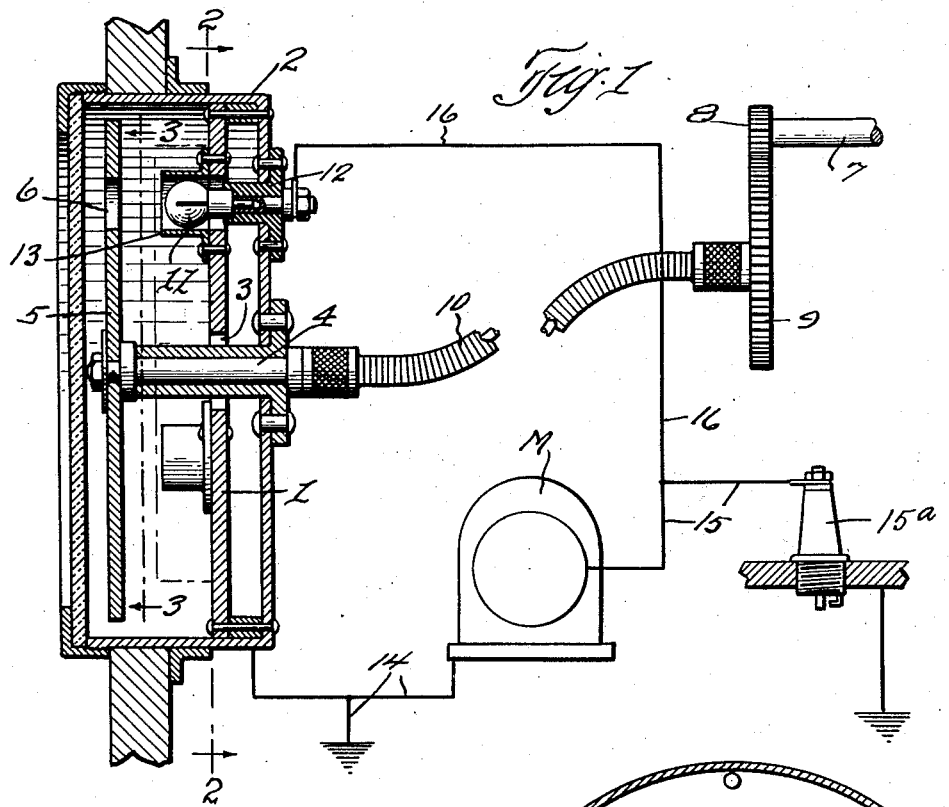
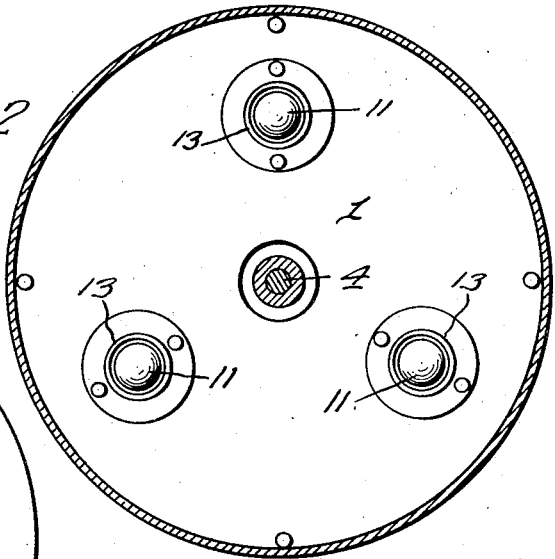
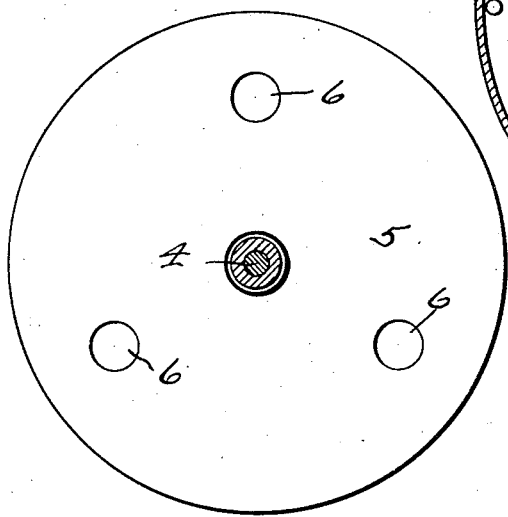
Inventor
J. W. Simmons
By Hull, Brock & Wrah
Attorney

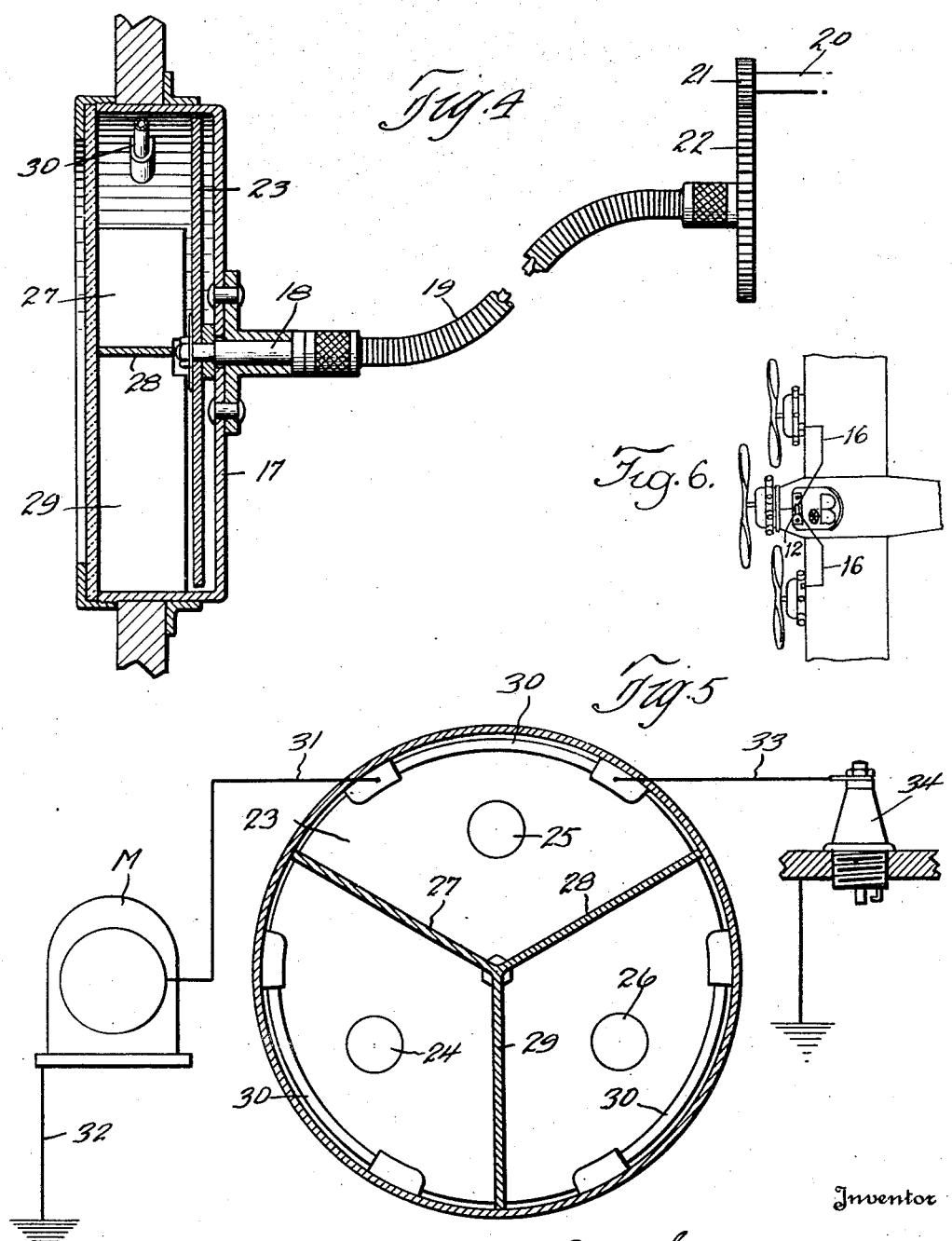

Patented July 25, 1933

1,920,113

UNITED STATES PATENT OFFICE

JOHN W. SIMMONS, OF CLEVELAND, OHIO, ASSIGNOR TO PIONEER INSTRUMENT COMPANY, INCORPORATED, OF BROOKLYN, NEW YORK, A CORPORATION OF NEW YORK

SPEED INDICATING DEVICE

Application filed August 16, 1929. Serial No. 386,425.

This invention relates to a tachometer or indicating device for indicating the speed of a plurality of motors and is of general application although the embodiment of the invention herein illustrated is particularly adapted for use in synchronizing the speed of the multi-motored aeroplanes.

The main object of the invention is to provide a speed indicating device for indicating the speed of a plurality of motors and which is simple in construction, dependable and efficient in operation and which comprises relatively few parts which will occupy a minimum space and which can be readily installed or disassembled with a minimum effort.

At present the outboard motors on aeroplanes are provided with a tachometer which is arranged on the side of the motor adjacent the cockpit so as to be visible to the pilot. This arrangement is not practical due to the fact that the dial is often obscured by oil from the motor, or in stormy weather by ice or water, thereby rendering the same useless. At night no means of illumination is available so the dial cannot be seen at all and the pilot is forced to estimate the speed of the outboard motors.

Therefore, one of the main objects of this invention is to provide a speed indicator which may be arranged within the cockpit of the aeroplane so as to be readily visible and accessible to the pilot and which will give a true indication of the speed of all of the motors and at the same time provide a means by which the pilot may synchronize the speed of the several motors. In devices of this character it is not practical to make use of the ordinary form of chain or cable drive such as used on speedometers of automobiles due to the fact that the length of the chain or cable is such that it is likely to become broken or disconnected and cause considerable damage to the plane or its controls and possibly force the plane down out of control. My device eliminates these difficulties and is of such a nature that the pilot at all times is able to ascertain the speed of the several motors and to determine whether or not the motors are running in synchronism.

The device as a whole embodies comparatively few parts which may be arranged within a suitable casing and secured to the instrument panel in the cockpit of the aeroplane.

Further and more limited objects of the invention will appear as the description proceeds and by reference to the accompanying drawings in which Fig. 1 is a vertical sectional view of my improved indicating device attached to the instrument board of an aeroplane and diagrammatically illustrating the electrical connections therefor; Fig. 2 is a view in end elevation on the line 2—2 of Fig. 1; Fig. 3 is a view in end elevation on the line 3—3 of Fig. 1; Fig. 4 is a sectional view similar to Fig. 1 illustrating a modification of my invention and Fig. 5 is an end elevation on the line 5—5 of Fig. 4. Fig. 6 is a diagrammatic view of applicant's device as applied to a multi-motored aeroplane.

Referring now to the drawings, the reference character 1 designates a stationary panel which is preferably formed of some suitable conducting material and which is enclosed within a casing 2 adapted to be secured within an opening in the instrument board of an aeroplane. The panel 2 is provided with a centrally disposed opening 3 through which extends a shaft 4 to the outer end of which is non-rotatably secured a disk 5 having openings 6 therein. The disk 5 may be formed of paper, metal or any other suitable material. The shaft 4 is provided with suitable bearings and is preferably driven from the cam shaft 7 of the central motor through suitable reduction gearing 8 and 9 and a flexible coupling 10. The central motor is usually located immediately in front of or behind the cockpit. It is, of course, understood that the shaft may be driven directly from the crank shaft of the motor, or, if desired, by means of an impeller or by a synchronous electric motor. Carried by the panel 1 are a plurality of gas illuminated tubes 11 of the neon type which are mounted in suitable insulating plugs or blocks 12 which project through the back of the casing 2, as shown most clearly in Fig. 1.

Assuming that the device is to be used in connection with a three-motor aeroplane, the grid of each of the tubes is connected in circuit with one of the spark plugs of each of the motors respectively. Also carried by the panel surrounding each of the tubes are collars or sleeves 13 which are secured to the panel by suitable screws or rivets. These collars or sleeves project outwardly from the face of the panel a slight distance as shown most clearly in Fig. 1. The collars or sleeves serve a double purpose, first as electrodes and second to confine or concentrate the light flashes of the tubes so that the tubes will be visible only immediately in front of the panel.

When the motors are started, the electrodes of the several tubes become incandescent and the tubes are rendered luminous at predetermined intervals depending upon the speed at which the motors are running. The shaft 4 is driven at a comparatively slow rate of speed, preferably about one-sixth or one-eighth that of the central motor. It should be understood that one luminous tube is provided for each motor and the embodiment of the invention herein illustrated is designed for use with a three-motor aeroplane in which case there are three tubes and three openings in the disk which are equally spaced apart. One of the three tubes is connected in circuit with one of the spark plugs of the central motor. It will therefore be clear that this tube will light or flash in direct ratio with the speed of the motor. For example, if the disk is directly connected to the crank shaft of the central motor and the central motor is of the four cycle type, the light will flash every second revolution of the disk. If the shaft is geared up to a two to one ratio, the light will flash every revolution of the disk. It is therefore apparent that if the light flash occurs when one of the openings 6 is directly opposite the tube, the flash will appear to remain stationary. The center motor is therefore always in synchronism with the disk. It will therefore be seen that it is a relatively simple matter for the pilot to synchronize the other three motors. This is accomplished by speeding up or slowing down the other motors until flashes of the corresponding tubes are seen through their respective openings and appear stationary. If one of the motors is running faster than the center motor, the flashes or openings in the disk will appear to move in one direction and if moving slower, the flashes will appear to move in the opposite direction. It is therefore apparent that this device will enable the pilot to operate all of the motors at the same speed or at different speeds, if desired. For example, the pilot may wish to operate one of the outboard motors at a faster speed than the others. To do this, he changes the speed of the motor until the light flashes for that particular motor appear to move, we will say, clockwise, or if he desires this motor to be operated at a slower speed than the others, he adjusts the speed of the motor until the light flashes appear to move counter-clockwise.

The position of the shaft 4 and the disk 5 may, if desired, be so adjusted that the openings in the disk will be out of axial alignment with the tubes when the same are rendered luminous. In this case, when the motors are all operating in synchronism, none of the lights or flashes will be visible. However, should one of the motors become out of synchronism, the light flash of that particular motor will become visible. It will therefore be apparent that it requires no change other than the setting of the disk in slightly different timing relation to the central motor to operate the device in this manner. The disk is preferably black over its entire surface and no light will show through the openings until one of the motors becomes out of synchronism. Should one light become visible through the openings, the speed of that motor is increased or decreased until the flash is no longer visible. The openings 6 in the disk 5 are only of sufficient size to enable the pilot to see the flashes and, if desired, different colored lights may be used for the different motors.

In order to adapt the device for use with an aeroplane having four or more motors, it is only necessary to provide a corresponding number of tubes and a disk having a corresponding number of openings.

According to the preferred embodiment of my invention, the panel 1 is formed of conducting material and is grounded on the frame of the aeroplane by means of a wire 14. The magneto M is also grounded on the frame. Leading from the opposite side of the magneto is a wire 15 leading to the spark plug 15$^a$. Leading from the wire 15 is a wire 16 which connects with the socket 12 which carries the tube 11. The sleeve or collar 13 being connected to the panel 1 serves as the other electrode for the tube. The electrical connections for each of the tubes is identical and therefore only one has been described.

It will therefore be seen that by making use of the collars or sleeves which are grounded on the frame, it is necessary to have only one wire leading from the indicator to each motor. The sleeves, being grounded on the frame, provide capacity coupled electrodes for the tubes which are not directly in the circuit.

In Figs. 4 and 5 there is disclosed a slightly modified form of my invention in which the same results may be obtained in a slightly different manner. According to this embodiment of my invention, I provide a casing 17 adapted to be mounted within an opening in the instrument panel of an aeroplane. Journaled in the casing 17 is a shaft 18 having a flexible connection 19 connected with the cam shaft 20 of the central motor and driven through reduction gearing 21 and 22. Arranged within the casing and non-rotatably connected with the shaft 18 is a disk 23 on which are provided spots or designs 24, 25 and 26 which may be of the same or different colors.

Arranged within the casing are a plurality of partitions 27, 28 and 29 which divide the casing into three compartments. Arranged within each of the compartments is a luminescent tube 30 of the neon type which is disposed in front of the disk 23 in such a manner that one tube lights only one of the compartments. Leading from one of the tubes 30 is a wire 31 which connects with the magneto M of the central motor which is grounded on the frame by wire 32. Leading from the opposite terminal of the tube 30 is a wire 33 which connects with the spark plug 34 of the central motor. The disk is rotated at a constant speed in the manner hereinbefore described. The other tubes 30 are connected in series with the respective motors in a similar manner. It will therefore be apparent that the tubes 30 will flash a direct ratio to the speed of the respective motors. When the spots or designs on the disk appear stationary, the motors will all be operating in synchronism and when one or more of the spots or designs appear to move clockwise or counter-clockwise, the corresponding motor or motors will be operating either too fast or too slow. It will therefore be a simple matter for the pilot to speed up or slow down the corresponding motor until all of the motors are operating at the proper speed.

It is therefore understood that two methods of producing illumination are available. The internal electrodes of the tube may be connected in series between the magneto and the spark plug in which case a much more brilliant illumination is obtained, or the tubes may be energized by the capacity external electrode arrangement in which case illumination is not quite so brilliant.

It will now be clear that I have provided a device which will accomplish the objects of the invention as hereinbefore stated. Various changes may be made in the details of construction as well as in the manner of arranging the various parts without departing from the spirit of the invention. For example, in the embodiment of my invention disclosed in Figs. 1 to 3 inclusive, it would be entirely practical to rotate the panel containing the tubes and hold the disk stationary. It is, therefore, to be understood that the embodiments of the invention herein disclosed are merely illustrative and are not to be considered in a limiting sense; and that my invention is limited only in accordance with the scope of the appended claims.

Having thus described my invention, what I claim is:

1. In a multi-motored aeroplane, an indicator arranged so as to be visible to the pilot of the aeroplane and adapted to indicate when the motors are operating in synchronism, said indicator comprising a rotatably mounted dial, a plurality of electric lamps disposed behind said dial and electrically connected with the ignition systems of said motors respectively, said dial having a plurality of apertures therein so arranged as to render the light from said lamps visible under certain predetermined conditions and means for rotating said dial.

2. In combination with a plurality of internal combustion engines, an indicator for indicating when said engines are operating in synchronism and comprising a rotatably mounted dial having openings therein, a plurality of electric lamps disposed behind said dial and visible through said openings under predetermined conditions, said lamps being connected in the electrical circuit with the ignition systems of said engines respectively.

3. A speed indicating device for indicating the relative speed of a plurality of motors comprising a plurality of luminescent tubes electrically connected with the ignition systems of said motors respectively, a rotatable disk disposed in front of said tubes and having a plurality of apertures therein and means for rotating said disk.

4. A speed indicating device for indicating when a plurality of internal combustion engines are running in synchronism, said device embodying a rotatable disk having openings therein and a plurality of lamps connected in electrical circuit with said motors respectively, and means for rotating said disk at the same relative speed as one of said motors.

5. In a speed indicating device of the character set forth adapted for indicating when a plurality of motors are running in synchronism and comprising an apertured dial and means for rotating the same in synchronism with one of said motors, a plurality of electric lamps disposed adjacent said dial and electrically connected with the ignition system of said motors respectively.

6. An indicator for indicating when a plurality of motors are running in synchronism and comprising a rotatably mounted dial having apertures therein spaced at predetermined intervals, a plurality of electric lamps disposed adjacent said dial and connected with the ignition systems of the motors respectively, and means for rotating said dial at the same relative speed as one of said motors.

7. An indicator for indicating when a plurality of motors are operating in synchronism and comprising an apertured dial, a plurality of electric lamps disposed adjacent said dial and energized from a part of the ignition systems of said motors respectively thereby causing periodic illumination of said lamps, and means causing a relative movement between said dial and lamps to periodically render said lamps visible and invisible so that they appear to be illuminated continuously to produce simultaneous indications of the relative speeds of the motors.

8. An indicator for indicating when a plurality of internal combustion engines are operating in synchronism and comprising a rotatably mounted dial having apertures therein, a plurality of luminescent tubes disposed adjacent said dial, and connected with the ignition systems of said engines respectively thereby causing periodic illumination of said luminescent tubes, and means for rotating said dial in synchronism with one of said engines to produce a direct indication of the relative speeds of said engines.

9. An indicator for indicating when a plurality of internal combustion engines are operating in synchronism and comprising a dial having apertures therein, a shaft extending from said dial and means for rotating the same at a predetermined speed, a plurality of electric lamps disposed adjacent said dial and energized from a part of the ignition systems of said engines respectively so as to be lighted at predetermined intervals depending upon the speed of said engines respectively.

10. An indicator of the character set forth indicating when a plurality of internal combustion engines are operating in synchronism and comprising a panel having an opening therein, a shaft extending through said opening, a disk non-rotatably secured to said shaft, and having a plurality of openings therein and disposed in front of said panel, a plurality of luminescent tubes connected in the electrical circuit with the ignition systems of said motors respectively and adapted to be lighted at predetermined intervals depending upon the speed of said motors, means for rotating said shaft and disk and a shield secured about each of said tubes and serving to direct the rays of light from said tube, said shields being grounded and serving also to complete the circuit to said tubes.

11. The combination with a plurality of internal combustion engines, of means for indicating when said engines are running in synchronism including means adapted to be periodically illuminated from the ignition system of one of said engines and in synchronism therewith, and means operated by another of said engines for periodically altering the visibility of said illuminating means in synchronism with said latter engines, so that said illuminating means appear to be lighted continuously and to be moving in one direction or another when said engines are not in synchronism.

12. The combination with a plurality of internal combustion engines provided with ignition systems for operating them, of means for indicating when said engines are running in synchronism includig a lamp of the neon type for each of said engines except one and arranged to be periodically illuminated in synchronism with their respective engines by high tension alternating currents supplied thereto from said engines, and means operated by the one engine for rendering said lamps visible and invisible in synchronism with the rotation of said latter engine so that said lamps appear to be illuminated continuously and to be rotated clockwise or counter-clockwise when said engines are not in synchronism.

JOHN W. SIMMONS.